(12) United States Patent
James et al.

(10) Patent No.: US 7,678,203 B2
(45) Date of Patent: Mar. 16, 2010

(54) WELDING FLUX

(75) Inventors: Matthew Jay James, Brunswick, OH (US); Patrick J. Coyne, Eastlake, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 603 days.

(21) Appl. No.: 11/072,842

(22) Filed: Mar. 4, 2005

(65) Prior Publication Data

US 2006/0196919 A1 Sep. 7, 2006

(51) Int. Cl.
B23K 35/363 (2006.01)
(52) U.S. Cl. .............................. 148/22; 148/23; 148/24
(58) Field of Classification Search ................. 228/223; 148/23, 23.22, 24; 75/10.46
See application file for complete search history.

(56) References Cited

U.S. PATENT DOCUMENTS

| | | | |
|---|---|---|---|
| 2,468,371 A | 4/1949 | Landis et al. | |
| 2,868,949 A | 1/1959 | Todd | |
| 2,927,990 A | 3/1960 | Johnson | |
| 3,076,735 A | 2/1963 | Sharav et al. | |
| 3,078,193 A | 2/1963 | Jackson | |
| 3,100,829 A | 8/1963 | Kubli et al. | |
| 3,272,667 A | 9/1966 | Siegle et al. | |
| 3,328,212 A | 6/1967 | Coless | |
| 3,424,626 A | 1/1969 | Coless et al. | |
| 3,448,241 A | 6/1969 | Buckingham et al. | |
| 3,571,553 A | 3/1971 | Godai et al. | |
| 3,663,313 A | 5/1972 | Oberly | |
| 3,692,590 A | 9/1972 | Godai et al. | |
| 3,868,491 A | 2/1975 | Ito et al. | |
| 3,885,120 A | 5/1975 | Ropitzky | |
| 4,017,339 A | 4/1977 | De Haeck | |
| 4,036,671 A | 7/1977 | De Haeck | |
| 4,221,611 A * | 9/1980 | Nagano et al. | 148/26 |
| 4,368,371 A | 1/1983 | Dilthey | |
| 4,436,562 A | 3/1984 | Tokuhisa | |
| 4,451,914 A | 5/1984 | LaBudde et al. | |
| 4,566,916 A | 1/1986 | Nagano | |
| 4,662,952 A | 5/1987 | Barringer et al. | |
| 4,675,056 A | 6/1987 | Melfi et al. | |
| 4,683,011 A * | 7/1987 | Weaver et al. | 148/26 |
| 4,750,948 A | 6/1988 | Consaul et al. | |
| 4,764,224 A | 8/1988 | Okuda et al. | |
| 4,940,882 A | 7/1990 | Bates | |
| 4,950,331 A | 8/1990 | Pokhodnya | |
| 5,120,931 A | 6/1992 | Kotecki et al. | |
| 5,300,754 A | 4/1994 | Gonzalez et al. | |
| 5,308,407 A | 5/1994 | Bishel et al. | |
| 5,308,696 A | 5/1994 | Hanashita | |
| 5,935,350 A | 8/1999 | Raghu et al. | |
| 6,331,688 B1 | 12/2001 | Hallen et al. | |
| 6,339,209 B1 | 1/2002 | Kotecki | |
| 6,375,895 B1 | 4/2002 | Daemen | |
| 6,939,413 B2 | 9/2005 | Crockett | |
| 2004/0187961 A1* | 9/2004 | Crockett | 148/23 |

FOREIGN PATENT DOCUMENTS

| | | |
|---|---|---|
| CA | 2459642 | 9/2004 |
| CA | 2525350 | 9/2006 |
| CA | 2533365 | 12/2006 |
| CN | 1657224 | 8/2005 |
| EP | 0051424 | 5/1982 |
| EP | 0626227 | 11/1994 |
| EP | 1468778 | 10/2004 |
| JP | 54-039817 B | 11/1979 |
| JP | 57-042438 B | 9/1982 |
| JP | 58128295 | 7/1983 |
| JP | 61-071195 A | 4/1986 |
| JP | 01-018837 B | 4/1989 |
| JP | 2000-343277 | 12/2000 |
| JP | 2001-105179 | 4/2001 |
| JP | 2005125345 | 5/2005 |

OTHER PUBLICATIONS

Lincoln Submerged Arc Product Catalog May 2003.
Lincoln Electric Material Safety Data Sheet Aug. 15, 2001.
Japan Patent Office, Office Action dated Jan. 21, 2009, 5 pages.

* cited by examiner

Primary Examiner—Jessica L. Ward
Assistant Examiner—Erin B Saad
(74) Attorney, Agent, or Firm—Jason R. Strobel; Hahn Loeser + Parks LLP

(57) ABSTRACT

A welding flux formulated for pipe welding or one-side welding applications including a gas releasing agent, a high melting compound and a low melting compound. The welding flux is particularly formulated for limited pass welding applications which exhibit high impact strength, good slag detachability, low weld metal hydrogen and nitrogen absorption, and facilitates in the formation of smooth and consistent weld beads.

13 Claims, No Drawings

WELDING FLUX

The present invention is in the general field of welding and more particularly directed to a welding flux that is particularly useful in submerged arc welding applications.

BACKGROUND OF THE INVENTION

In the field of arc welding, the five (5) main types of arc welding are submerged arc welding (SAW), shielded metal arc welding (SMAW), flux-cored arc welding (FCAW), gas metal arc welding (GMAW), and tungsten arc welding (TIG). In submerged arc welding, coalescence is produced by heating with an electric arc between a bare-metal electrode and the metal being worked. The welding is blanketed with a granular or fusible material or flux. The welding operation is started by establishing an arc beneath the flux to produce heat to melt the surrounding flux so that it forms a subsurface pool which is kept fluid by the continuous flow of current. The end of the electrode and the work piece directly below it become molten and molten filler metal is deposited from the electrode onto the work. The molten filler metal displaces the flux pool and forms the weld.

In the art of welding, much prior effort has been expended in developing flux compositions of the type having predetermined flux components intended to perform in predetermined manners. A large number of compositions have been developed for use as fluxes in arc welding both for use generally as welding fluxes and for use as a coating on a metallic core or within a sheath. Fluxes are utilized in arc welding to control the arc stability, affect the flow of molten metal, modify the weld metal composition, and provide protection from atmospheric contamination. Arc stability can be at least partially controlled by modifying the composition of the flux. It is therefore desirable to have substances which function well as plasma charge carriers in the flux mixture. Fluxes also modify the weld metal composition by rendering impurities in the metal more easily fusible and providing substances which these impurities may combine with in preference to the metal to form slag. Practically all slag-forming compounds may be classed as either acidic or basic, according to which compounds they react with. The substances which are considered to be the most active "bases" are those which are compounds of the elements forming basic compounds in ordinary chemical reactions in water solutions, such as calcium, magnesium, and sodium. The most common active "acid" substances are compounds of silicon, titanium, zirconium and aluminum. Fluxes are prepared with a higher or lower percentage of acidic or basic compounds, depending on the type of metal to be welded and impurities in the metal, the welding application, and/or the desired mechanical properties of the weld bead. In some instances, other materials may be added to lower the slag melting point, to improve slag fluidity, and to serve as binders for the flux particles.

The present invention is particularly directed to a submerged arc welding flux which exhibits improved impact strength, improved slag detachability, inhibits hydrogen absorption in the weld metal and/or improves the formation of a weld bead.

SUMMARY OF THE INVENTION

The present invention pertains to welding fluxes, and more particularly, to a submerged arc welding flux. Although the welding flux will be particularly described with reference to a submerged arc welding flux, the welding flux has broader applications and can be used to coated electrodes or be used as a fill in a flux cored electrode.

The welding flux of the present invention is formulated for limited pass welding applications. In such applications, the welding flux exhibits high impact strength, good slag detachability, low weld metal hydrogen absorption, and facilitates in the formation of smooth and consistent weld beads. The welding flux is particularly useful for the formation of seams on pipes. Many repairs on high-grade pipe are due to undercutting, which occurs when the weld metal at the toes of the weld does not flow consistently, thereby causing incomplete filling of the weld crater. The incomplete formation of the weld bead results in loss of productivity due to having to inspect and/or to fix the pipe weld. The welding flux of the present invention is formulated to facilitate in the smooth and consistent formation of a weld bead at the weld toe during the formation of a pipe weld. As such, the use of the welding flux of the present invention reduces the incidence of undercutting. As can be appreciated, the welding flux can be used in applications other than pipe welding to achieved a desired weld bead. For instance, the welding flux can be used in one-side welding applications (i.e., where all the welding is accomplished on one side of a plate or other type of workpiece, and the bead on the backside of the plate is formed from the flow of the metal/slag through the weld joint). Other welding applications can also use the welding flux of the present invention.

The welding flux is also formulated to accommodate multiple arcs and/or can be used in AC welding applications. The welding flux includes one or more low melting point materials and one or more easily ionized materials to facilitate in the formation of a stable arc during the welding process and/or positively affect the viscosity and flow characteristics of the slag to facilitate in the smooth and consistent formation of a weld bead, especially at the weld toe during pipe welding. As such, the welding flux is particularly suitable for use in pipe fabrication (pipe mills).

In one aspect of the present invention, the welding flux includes a siliceous material to reduce the melting point of the flux and/or allow for easy ionization of one or more components of the flux. Non-limiting siliceous material that can be used include, but are not limited to is sodium silicate glass, and/or lithium silicate glass. These types of siliceous materials are low melting materials that are easy to ionize. As defined in this invention, a low melting point material is an element and/or compound that has a melting point that up to about the melting point of steel (e.g., 2590° F. or 1420° C.). High melting material is defined as an element and/or compound having a melting point above the melting point of steel. The addition of a siliceous material such as lithium silicate glass can be used to limit the tendency of the flux to absorb moisture. The use of a siliceous material can also be used to improve the arc stability during welding, thereby reducing spattering. The use of a siliceous material can also be used to positively affect the viscosity of the slag and flow characteristics of the slag, thus facilitating in improved weld bead formation. As can be appreciated, other or additional siliceous materials can be used (e.g. potassium silicate glass, etc.). The siliceous material content of the welding flux generally about 5-35 weight percent of the flux.

In another and/or alternative aspect of the present invention, the welding flux includes a gas releasing agent. One particular gas releasing agent that can be used is a carbonate compound. Various types of carbonate compounds can be used such as, but not limited to calcium carbonate, magnesium carbonate, strontium carbonate, sodium carbonate, sodium bicarbonate, potassium carbonate, etc. As can be appreciated, other gas releasing agents can be used (e.g., fluoride releasing compounds, gas containing beads, etc.).

For purposes of this invention, calcium fluoride is a low melting compound, not a gas releasing agent. The gas releasing agent is formulated to release one or more gasses during a welding operation thereby creating a shielding environment about the weld metal. The gas releasing material is present in an amount to release a large amount of gas at or below welding temperatures so as to form a gas shield about the weld pool during a welding process. The nitrogen and hydrogen in the air about a molten weld pool tends to absorb into the motel weld pool and adversely affect the properties and quality of the formed weld bead. Nitrogen has a tendency to reduce the impact strength of a weld bead. Hydrogen has a tendency to cause cracking on the weld bead, especially when forming high strength weld metals. The gas releasing agent thus forma a shield for the motel weld metal from nitrogen, hydrogen and/or other detrimental gasses in the atmosphere so that a high quality weld bead is formed. The gas releasing agent composition of the welding flux is about 0.05-25 weight percent of the flux, and typically about 2-15 weight percent of the flux. The weight percent ratio of gas releasing agent to non-gas releasing agent in the welding flux is about 1:4-100, typically about 1:5-50, and more typically about 1:7-25; however, other ratios can be used.

In still another and/or alternative aspect of the present invention, the welding flux typically includes an arc stabilizing compound. The arc stabilizing compound typically includes an alkali metal compound wherein the alkali metal disassociates from the compound at or below the welding temperatures. Such materials can include materials such as potassium fluoride, potassium oxide, lithium oxide, sodium oxide, etc. The arc stabilizing content of the welding flux is about 0.05-15 weight percent of the flux, typically about 2-7 weight percent of the flux; however, other weight percentages of the arc stabilizer can be used.

In another and/or alternative aspect of the present invention, the welding flux includes a gas releasing agent. One particular gas releasing agent that can be used is a carbonate compound. Various types of carbonate compounds can be used such as, but not limited to calcium carbonate, magnesium carbonate, strontium carbonate, sodium carbonate, sodium bicarbonate, potassium carbonate, etc. As can be appreciated, other gas releasing agents can be used (e.g., fluoride releasing compounds, gas containing beads, etc.). For purposes of this invention, calcium fluoride is a low melting compound, not a gas releasing agent. The gas releasing agent is formulated to release one or more gasses during a welding operation thereby creating a shielding environment about the weld metal. The gas releasing material is present in an amount to release a large amount of gas at or below welding temperatures so as to form a gas shield about the weld pool during a welding process. The nitrogen and hydrogen in the air about a molten weld pool tends to absorb into the molten weld pool and adversely affect the properties and quality of the formed weld bead. Nitrogen has a tendency to reduce the impact strength of a weld bead. Hydrogen has a tendency to cause cracking on the weld bead, especially when forming high strength weld metals. The gas releasing agent thus form a shield for the molten weld metal from nitrogen, hydrogen and/or other detrimental gasses in the atmosphere so that a high quality weld bead is formed. The gas releasing agent composition of the welding flux is about 0.05-25 weight percent of the flux, and typically about 2-15 weight percent of the flux. The weight percent ratio of gas releasing agent to non-gas releasing agent in the welding flux is about 1:4-100, typically about 1:5-50, and more typically about 1:7-25; however, other ratios can be used.

In still another and/or alternative aspect of the present invention, the yield strength and/or impact strength of the weld bead formed by use of the welding flux can be controlled by selecting the appropriate solid metal wire or cored electrode for use with the welding flux. The yield strength and/or impact strength of the weld bead can also or alternatively be controlled by the metal alloy composition of the welding flux. Various types of metal alloys can be included in the welding flux. Non-limiting examples of metal alloys include, but are not limited to, aluminum, boron, calcium, carbon, iron, manganese, nickel, silicon, titanium, zirconium, etc. The metal alloy composition of the welding flux is up to about 15 weight percent of the flux.

It is one object of the present invention to provide an improved flux system in accordance with the present invention which improves the formation of weld beads.

Another and/or alternative object of the present invention is the provision of an improved flux system that can facilitate in the formation of smooth and/or consistent weld toe entry angles.

Still another and/or alternative object of the present invention is the provision of a flux system which can facilitate in the formation of a weld bead having improved high impact strength.

Yet another and/or alternative object of the present invention is the provision of a flux system which can facilitate in the formation of a slag having improved slag detachability.

Still yet another and/or alternative object of the present invention is the provision of a flux system which can facilitate in the formation of a weld bead having reduce nitrogen and/or hydrogen content.

A further and/or alternative object of the present invention is the provision of a flux system that can be used as a welding flux.

Still a further and/or alternative object of the present invention is the provision of a flux system that forms a shielding gas during a welding procedure.

These and other objects and advantages will become apparent from the discussion of the invention as set forth below.

BRIEF DESCRIPTION OF THE INVENTION

The description of the invention disclosed herein is solely for the purpose of setting forth the preferred embodiment of the invention, and not for the purpose of limiting the invention. The flux system of the present invention is typically a submerged arc welding flux; however this is not required. The components of the welding flux include one or more metal oxides (e.g., aluminum oxide, boron oxide, calcium oxide, chromium oxide, iron oxide, lithium oxide, magnesium oxide, manganese oxide, niobium oxide, potassium oxide, silicon dioxide, sodium oxide, tin oxide, titanium oxide, vanadium oxide, zirconium oxide, etc.), one or more metal carbonates (e.g., calcium carbonate, etc.), one or more metal fluorides (e.g., barium fluoride, bismuth fluoride, calcium fluoride, potassium fluoride, sodium fluoride, Teflon, etc.), and/or one or more metal alloying agents (e.g, aluminum, boron, calcium, carbon, iron, manganese, nickel, silicon, titanium, zirconium, etc.).

The welding flux is particularly formulated for limited pass welding applications which exhibit high impact strength, good slag detachability, low weld metal hydrogen and nitrogen absorption, and facilitates in the formation of smooth and consistent weld beads. The welding flux is particularly useful for use in pipe fabrication or one sided welding applications. The welding flux has a composition that enables a stable arc during the welding process and/or positivity affect the viscosity and flow characteristics of the slag to facilitate in the smooth and consistent formation of a weld bead, especially at the weld toe entry angles during pipe welding or for various types of one sided welding applications.

The welding flux has the following general composition by weight percent of the flux:

| | |
|---|---|
| Arc stabilizer | 0.05-10% |
| Gas Releasing Agent | 0.05-25% |
| High melting component | 5-75% |
| Low melting component | 2-40% |
| Metal alloying agents | 0-25% |

A more specific formulation of the flux of the present invention by weight percent of the flux:

| | |
|---|---|
| Arc stabilizer (Li, K, and/or Na compound) | 0.1-7% |
| Gas Releasing Agent (Carbonate and/or Fluoride compound) | 1-20% |
| High melting component | 10-70% |
| Low melting component | 5-30% |
| Metal alloying agent | 0-20% |

Another more specific formulation of the flux of the present invention by weight percent of the flux:

| | |
|---|---|
| $Al_2O_3$ | 10-35% |
| $CaF_2$ | 5-25% |
| $CaCO_3$ | 2-15% |
| FeO | 0-4% |
| $K_2O$ | 0-2% |
| $Li_2O$ | 0-2% |
| MgO | 0-25% |
| MnO | 0-25% |
| $Na_2O$ | 0-8% |
| $SiO_2$ | 4-30% |
| $TiO_2$ | 0-4% |
| $ZrO_2$ | 0-9% |
| Metal alloying agent | 0-10% |

Still another more specific formulation of the flux of the present invention by weight percent of the flux:

| | |
|---|---|
| $Al_2O_3$ | 20-30% |
| $CaF_2$ | 10-15% |
| $CaCO_3$ | 3-12.5% |
| FeO | 0.5-2% |
| $K_2O$ | 0.01-0.8% |
| $Li_2O$ | 0.01-0.8% |
| MgO | 12-20% |
| MnO | 7-15% |
| $Na_2O$ | 1.5-5% |
| $SiO_2$ | 11-23% |
| $TiO_2$ | 0.1-2.5% |
| $ZrO_2$ | 0.5-3.5% |
| Mn | 0-3% |
| Si | 0-3% |

As can be appreciated, a single compound can constitute one or more of the components of the welding flux. For instance, lithium silicate and/or sodium silicate can be included in the welding flux. The lithium silicate and sodium silicate, when used, can be part of or the complete source of the $LiO_2$ and $Na_2O$ of the welding flux. The sodium silicate is principally used as a binder for the components of the welding flux. The sodium can also facilitate in arc stabilization during the welding process. The lithium oxide alters the "flow" characteristics of the weld puddle (e.g., weld metal and slag) to reduce the amount of undercutting during a welding process. The lithium oxide also reduces moisture pickup of the weld metal. When a siliceous material is included in the flux, the siliceous material is used to adjust the melting/freezing range of the slag during welding. Feldspar can also be included in the welding flux and can be the source of CaO, $Na_2O$, $K_2O$, $Al_2O_3$ and/or $SiO_2$, or one or more other metal oxides in the welding flux. The calcium fluoride in the flux is used to modify the "flow" characteristics of the flux about the weld puddle. The zirconium oxide is also added to the welding flux principally as a slag modifier. The zirconium oxide is a high melting point metal oxide that alters the freezing characteristics of the slag to facilitate in the formation of more consistent weld bead edges and to also reduce undercut. Calcium carbonate is included in the welding flux as a gas releasing agent. The carbonate portion of this compound is used as a shielding gas during the welding process to shield the weld puddle from nitrogen and hydrogen. As can be appreciated, other or additional gas releasing agents can be used in the flux (e.g., magnesium carbonate, strontium carbonate, organic fluorides, etc.). The one or more gas releasing agents are selected to release a relatively large volume of gas at or below the welding temperatures. The positive pressures resulting from the release of the gas during a welding procedure at least partially shields the area about the weld puddle from the gasses in the atmosphere. As such, low levels of hydrogen and/or nitrogen in the weld metal can be obtained by use of a gas releasing agent in the flux. The metal alloying agents are primarily added to obtain the desired alloy composition of the weld bead; however, metals such as, but not limited to, silicon can also function as deoxidizing agents during the welding process. The metal alloying agents can be added in pure form or be added as an alloy. For instance silicon can be added as SiFe and Mn can be added as MnFe; however, this is not required. The flux can also include other components such as, but not limited to arsenic, barium, boron, lead, phosphorus, sulfur and zinc. These compounds can be in the form of impurities and/or be intentionally added to the flux. Typically, the weight percent limits of these components is:

| | |
|---|---|
| As | up to about 0.1% |
| B | up to about 0.02% |
| Ba | up to about 0.1% |
| Pb | up to about 0.1% |
| P | up to about 0.02% |
| S | up to about 0.01% |
| Zn | up to about 0.1% |

When a carbonate compound is was as a gas releasing agent, the flux includes a carbon content. The total carbon content of the flux, including the carbon from the carbonate compound, is typically less than about 0.5%, and more typically less than about 0.4%.

The welding flux can be dried and/or ground. The welding flux can also be screened to obtain an average particle size of the welding flux. Typically the particle size of the welding flux is about 12-200 mesh; however, other average particle sizes can be used. The drying, grinding and/or screen process can be accomplished by standard techniques, thus will not be further described.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A welding flux formulated for pipe welding or one-side welding applications including about 0.05-25 weight percent gas releasing agent, a high melting compound and a low melting compound, said weight percent ratio of said high melting compound to said low melting compound is about 1-5:1, said welding flux comprising by weight percent:

| | |
|---|---|
| $Al_2O_3$ | 20-30% |
| $CaF_2$ | 10-15% |
| $CaCO_3$ | 3-12.5% |
| FeO | 0.5-2% |
| $K_2O$ | 0.01-0.8% |
| $Li_2O$ | 0.01-0.8% |
| MgO | 12-20% |
| MnO | 7-15% |
| $Na_2O$ | 1.5-5% |
| $SiO_2$ | 11-23% |
| $TiO_2$ | 0.1-2.5% |
| $ZrO_2$ | 0.5-3.5% |
| Mn | 0-3% |
| Si | 0-3%. |

2. A welding flux formulated for pipe welding or one-side welding applications including about 0.05-25 weight percent gas releasing agent, at least about 0.05 weight percent arc stabilizing compound, up to about 75 weight percent high melting compound and up to about 40 weight percent low melting compound, said weight percent ratio of said high melting compound to said low melting compound about 1.1-5:1, said low melting compound including about 5-35 weight percent silicate glass, said silicate glass including at least one compound selected from the group consisting of sodium silicate glass, lithium silicate glass, potassium silicate glass, and combinations thereof, said arc stabilizing compound including at least one compound selected from the group consisting of a lithium oxide compound, a lithium fluoride compound, a potassium oxide compound, a potassium fluoride compound, sodium oxide compound, sodium fluoride compound, said welding flux including a plurality of components selected from the group consisting of As, B, Ba, C, P, Pb, S, Zn, and combinations thereof, said welding flux including, less than about 0.5 weight percent carbon, up to about 0.1 weight percent As, up to about 0.02 weight percent B, up to about 0.1 weight percent Ba, up to about 0.1 weight percent Pb, up to about 0.02 weight percent P, up to about 0.01 weight percent S, and up to about 0.1 weight percent Zn.

3. The welding flux as defined in claim 2, wherein said weight percent ratio of said high melting compound to said low melting compound is about 1.2-3:1.

4. The welding flux as defined in claim 2, wherein a weight percent of said arc stabilizer in said welding flux is about 0.05-15 weight percent.

5. The welding flux as defined in claim 2, wherein a weight percent ratio of gas releasing agent to non-gas releasing agent in the welding flux is about 1:4-100.

6. The welding flux as defined in claim 2, including about 0.01-25 weight percent metal alloying agent.

7. The welding flux as defined in claim 2, comprising:

| | |
|---|---|
| Arc stabilizer | 0.05-10% |
| Gas Releasing Agent | 0.05-25% |
| High melting component | up to 75% |
| Low melting component | 2-40% |
| Metal alloying agents | 0-25%. |

8. The welding flux as defined in claim 7, comprising:

| | |
|---|---|
| Arc stabilizer | 0.1-7% |
| Gas Releasing Agent | 1-20% |
| High melting component | up to 70% |
| Low melting component | 5-30% |
| Metal alloying agent | 0-20%. |

9. The welding flux as defined in claim 8, comprising:

| | |
|---|---|
| Arc stabilizer | 2-7% |
| Gas Releasing Agent | 2-10% |
| High melting component | up to 70% |
| Low melting component | 5-30% |
| Metal alloying agents | 0-10%. |

10. The welding flux as defined in claim 9, comprising:

| | |
|---|---|
| $Al_2O_3$ | 10-35% |
| $CaF_2$ | 5-25% |
| $CaCO_3$ | 2-15% |
| FeO | 0-4% |
| $K_2O$ | 0-2% |
| $Li_2O$ | 0-2% |
| MgO | up to 25% |
| MnO | 0-25% |
| $Na_2O$ | 0-8% |
| $SiO_2$ | 4-30% |
| $TiO_2$ | 0-4% |
| $ZrO_2$ | up to 9% |
| Metal alloying agent | 0-10%. |

11. The welding flux as defined in claim 2, wherein said high melting compound including up to 4 weight percent titanium dioxide.

12. The welding flux as defined in claim 9, wherein said high melting compound including up to 4 weight percent titanium dioxide.

13. The welding flux as defined in claim 2, wherein said high melting compound including less than 20 weight percent magnesium oxide.

* * * * *